Nov. 2, 1948.   J. KAROW   2,452,762
STOP LIGHT SIGNAL DEVICE
Filed Aug. 26, 1946
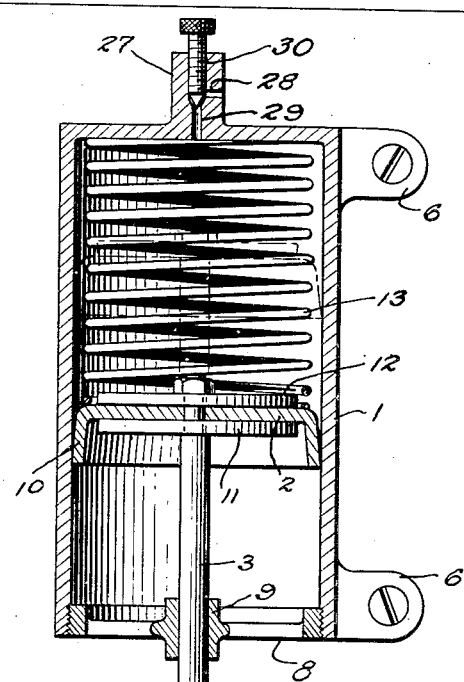
Fig.1.
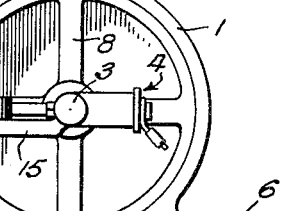
Fig.2.
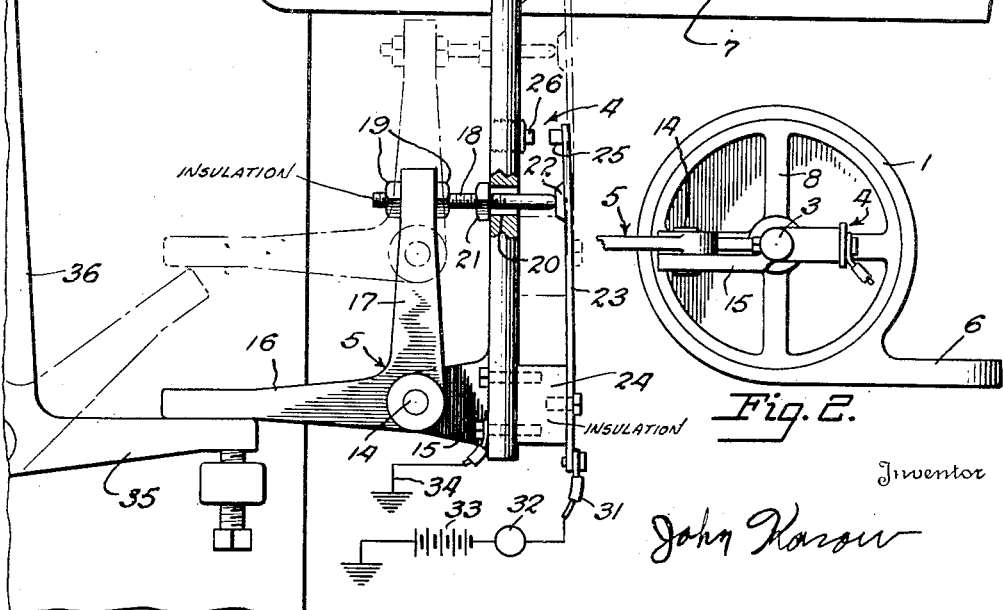
Inventor
John Karow Patented Nov. 2, 1948

2,452,762

UNITED STATES PATENT OFFICE 2,452,762

STOP LIGHT SIGNAL DEVICE

John Karow, De Forest, Wis., assignor to Sverre Quisling, Madison, Wis.

Application August 26, 1946, Serial No. 693,060

5 Claims. (Cl. 200—52)

This invention relates to control devices for signals, and more particularly to such controls peculiarly adapted for use with the well-known "stop" signals for motor vehicles.

For many years motor vehicles have been equipped with electric "stop lights," located at the rear of the vehicle and controlled by a switch connected to, and operated by, the brake pedal or appurtenant lever to warn following drivers when the brakes are applied and the car is to be stopped. These signals have proven effective and practical, but only give visual indication of the preceding driver's application of the brakes. No signal is given of the driver's intention to decelerate, although the speed of the car is frequently rapidly decreased simply by removing the foot from the accelerator pedal, and the motion of the car is more nearly in relation to the use of the accelerator than that of the brakes. Also, prolonged stops in traffic when the car is on an incline require constant application of the brakes with consequent continuous actuation of the signal, causing an extended and unnecessary drain on the vehicle battery.

The object of the present invention is to provide a control device for motor vehicle signals which is arranged for actuation by some portion of the vehicle's carburetor control mechanism so that its operation is responsive to, and in relation to, speed changes of the vehicle.

A more specific object of the invention is to provide such a control device which is actuated by a portion of the accelerator linkage to close a switch to a signal when the motor vehicle is decelerated.

Another object of the invention is to provide such a control wherein means are employed to maintain the signal switch in closed position for a predetermined time after actuation, and to automatically open, and hold open, said switch to prevent further drain on the vehicle battery thereafter.

Other objects of the invention will become apparent from the following description of a preferred and practical embodiment of the invention taken in conjunction with the drawing which accompanies and forms a part of this specification.

In the drawings:

Figure 1 is a vertical section through a control device embodying the principles of the present invention, the device being shown attached to a carburetor, and the electric circuit to the signal being shown diagrammatically; and Figure 2 is a partial bottom plan view of the device shown in Figure 1.

Referring to the drawings in detail, the control device comprises a cylinder 1 in which is slidably positioned a piston 2 having a piston rod 3 attached thereto which carries a switch 4 and an actuating lever 5.

The cylinder 1 is provided with lugs 6, by means of which it may be secured to the carburetor 7, or other suitable portion of the motor or vehicle. The cylinder is open at its bottom end, across which opening a brace or spider 8 is fixedly positioned. Spider 8 is provided with bosses 9 forming a sleeve, centrally positioned with respect to the cylinder 1, to provide a supporting bearing for the piston rod 3 to maintain its axial alignment with respect to the cylinder.

Piston 2, which is fixed to the upper end of piston rod 3, is of the type frequently employed in reciprocating pumps, and comprises a cupped pump leather 10 and washers 11 and 12 interiorly and exteriorly mounted upon the piston rod with respect to the pump leather 10. A coiled spring 13 normally urges piston 2 toward the lower end of the cylinder.

Piston 2 is moved upwardly in cylinder 1 against the pressure of spring 13 by means of the bellcrank actuating lever 5 which is pivotally attached, as at 14, to a bracket 15 projecting from piston rod 3 at its lower end. Lever 5 has a horizontal arm 16 and a vertical arm 17, the arm 17 having a hole through its upper portion, through which passes a plunger 18 of insulating material. Plunger 18 is threaded throughout a portion of its length, and nuts 19 on either side of the lever arm 17 fix the plunger to the lever arm. Piston rod 3 is also provided with an opening, the opening 20 being of sufficient size to receive plunger 18 and permit the plunger to pass freely therethrough when the lever 5 is rocked. A third nut 21 is threaded upon the plunger and forms a stop to limit the inward movement of the plunger and the clockwise rotation of lever 5, as viewed in Figure 1. It will be obvious from an inspection of the drawing that upward pressure applied to arm 16 of lever 5 will cause lever 5 to rotate in a clockwise direction until stop 21 strikes piston rod 3, whereupon continued upward pressure will cause lever 5, piston rod 3, and piston 2 to move bodily upward, as shown in dotted lines in Figure 1, advancing the piston in the cylinder and compressing spring 13.

When plunger 18 moves inward through opening 20 in piston rod 3, the end of the plunger will strike a block 22 attached to a spring metal strip 23, which forms the movable arm of the switch 4, and moves the switch arm to open position. Spring arm 23 is fixedly secured to an insulating block 24 carried by piston rod 3. The free end of arm 23 carries a contact point 25. As mentioned above, arm 23 is spring metal, and the arm is biased toward contact position with a second contact point 26 attached to piston rod 3. The contacts 25 and 26 are closed only when lever 5 swings in a counterclockwise direction, releasing spring arm 23 from the pressure of plunger 18. Plunger 18 is so adjusted that when lever 5 is rocked in a clockwise direction the plunger will strike arm 23 opening contacts 25, 26 before stop 21 abuts the piston rod.

Piston 2, when moved upwardly, will permit the air trapped ahead of it to pass between the cylinder and the piston by the inward contraction of the piston skirt in well known manner. Downward movement of the piston will cause the piston skirt to expand, tightly hugging the walls of the cylinder and pulling a vacuum behind it. This would prevent the piston from moving downward under the influence of spring 13 beyond a certain distance unless some means is provided to admit air behind the piston to relieve the vacuum. To accomplish this, a relief valve 27 is placed in the upper part of the cylinder. This valve may be of any suitable type, and is here shown as having air passages 28 and 29 intersecting at an angle, passage 28 communicating with the atmosphere, and passage 29 with the interior of the cylinder. An adjustable needle valve 30 controls the size of the air vent at the point of juncture of the passageways 28 and 29. The valve serves as a regulator, as the adjustment of the air vent will determine the rate of air flow and consequently the speed of the return of the piston.

At the lower portion of Figure 1 there is shown diagrammatically one way in which the control device may be connected to a suitable signal. A wire 31 is shown attached to a binding post at the lower end of spring arm 23, which wire is connected to a signal light 32, and from light 32 to the vehicle battery 33. The opposite side of the battery is grounded as at 34. The piston rod 3, to which the contact 26 is attached is also grounded.

As stated above, the device is operated by upward pressure upon arm 16 of lever 5. It is contemplated that this pressure will be supplied by some movable portion of the existing accelerator linkage on the vehicle, so as to render the device responsive to speed changes of the vehicle. For purposes of illustration, the device is shown positioned upon the vehicle carburetor 7 in such position that lever arm 16 will bear upon the adjusting arm 35 of the carburetor valve lever 36 under the influence of spring 13 in cylinder 1. When the vehicle accelerator pedal (not shown) is pressed to open the carburetor valve, lever 36 will be rocked, causing its adjusting arm 35 to rock in a counterclockwise direction lifting lever 5. Contact of lever arm 16 with any movable portion of the accelerator linkage will accomplish the desired movement of the control device to provide visual indication of deceleration of the vehicle.

Although the operation of the device has been given along with the description of the structure, a restatement of the complete operation will serve to clarify the function of the various parts. When the vehicle accelerator pedal is pressed, carburetor valve lever 36 will rock causing its arm 35 to press upward upon arm 16 of lever 5, and, as lever 5 cannot rock about its pivot 14 due to the fact that stop 21 is against piston rod 3, the piston rod will be moved, advancing the piston in cylinder 1 and compressing spring 13. During this movement, plunger 18 is abuting block 22 on spring contact arm 23 maintaining contacts 25 and 26 in open position and holding open the circuit to signal lamp 32. This position of the various parts is shown in dotted lines in Figure 1. Immediately upon removal of the foot from the accelerator, lever 36 of the carburetor will return to its position of rest with arm 35 against its stop, as shown in full lines in Figure 1. Piston 2, however, cannot immediately return to its position of rest due to the dash-pot effect of the relief valve 27. Thus the pressure upon the underside of arm 16 of lever 5 will be relieved, and lever 5 will rock in a counterclockwise direction by gravity, assisted by the bias of spring arm 23. This will permit arm 23 to move, closing contacts 25, 26 and close the circuit through signal light 32, giving visual indication that the vehicle is being decelerated. Piston 2 will slowly move downward under the influence of spring 13, its speed of descent being governed by the adjustment of valve 27. As the piston moves downward, arm 16 of lever 5 will contact arm 35 of lever 36 causing lever 5 to rock clockwise, moving plunger 18 inwardly to strike arm 23 and break contacts 25, 26, thus breaking the circuit to the signal light. The circuit will remain broken until the vehicle is accelerated again and pressure is released from lever 5 during deceleration.

Although I have in the above described what is believed to be a preferred and practical embodiment of the invention, it is to be understood that this disclosure is by way of illustration only, and that many changes may be made from the precise embodiment shown within the scope of the appended claims.

What I claim is:

1. A signal control adapted to be operated by a portion of a motor vehicle fuel feeding control comprising, a switch having a movable arm, a reciprocable support for said switch, a lever pivotally mounted on said support having an arm to contact said movable switch arm and an arm for engagement with said portion of the motor vehicle fuel feeding control, and a stop to limit the pivotal movement of said lever.

2. A signal control adapted to be operated by a portion of a motor vehicle fuel feeding control comprising, a switch having a movable arm, a reciprocable support for said switch, means on said support engageable by said portion of the motor vehicle fuel feeding control to open said switch and move said support, and means to retard the return movement of said support when the engagement with said portion of the motor vehicle fuel feeding control is broken.

3. In a signal control as claimed in claim 1, a cylinder, a piston in said cylinder carried by said support, and compressible means to urge the piston in one direction.

4. In a signal control as claimed in claim 1, a cylinder, a piston in said cylinder carried by said support, compressible means to urge the piston in one direction, and means to retard the movement of said piston in the opposite direction.

5. A signal control adapted to be operated by a portion of a motor vehicle fuel feeding control comprising, a switch having a movable arm, a reciprocable support for said switch, a lever pivotally mounted on said support having an arm to contact said movable switch arm and an arm for engagement with said portion of the motor vehicle fuel feeding control, a stop to limit the pivotal movement of said lever, a cylinder, a piston slidable in said cylinder carried by said support, a spring in said cylinder between said piston and the head of said cylinder to normally urge said piston away from said head, and a controlled air vent in the head of said cylinder.

JOHN KAROW.

REFERENCES CITED

The following references are of record in the file of this patent:

UNITED STATES PATENTS

| Number | Name | Date |
| --- | --- | --- |
| 2,178,854 | Gustafson | Nov. 7, 1939 |
| 2,380,494 | Ball | July 31, 1945 |